US012802446B2

(12) United States Patent
Rodrigues De Paula et al.

(10) Patent No.: US 12,802,446 B2
(45) Date of Patent: Nov. 17, 2026

(54) METHOD FOR DETECTING COLORED MOVING ELEMENTS IN A VIDEO FILE

(71) Applicant: SAMSUNG ELETRÔNICA DA AMAZÔNIA LTDA., Manaus (BR)

(72) Inventors: Adriano Rodrigues De Paula, Manaus (BR); Marcele Pinheiro Da Silva, Manaus (BR); Laynne De Andrade Candido, Manaus (BR); Paulo Roberto Belem De Seixas, Manaus (BR); Eric Da Silva Ferraz, Manaus (BR)

(73) Assignee: SAMSUNG ELETRÔNICA DA AMAZÔNIA LTDA., Manaus (BR)

( * ) Notice: Subject to any disclaimer, the term of this patent is extended or adjusted under 35 U.S.C. 154(b) by 221 days.

(21) Appl. No.: 18/668,567

(22) Filed: May 20, 2024

(65) Prior Publication Data

US 2025/0292572 A1 Sep. 18, 2025

(30) Foreign Application Priority Data

Mar. 14, 2024 (BR) ...................... 10 2024 005116 5

(51) Int. Cl.
*G06V 20/40* (2022.01)
*G06V 10/25* (2022.01)
(Continued)

(52) U.S. Cl.
CPC .............. *G06V 20/46* (2022.01); *G06V 10/25* (2022.01); *G06V 10/26* (2022.01); *G06V 10/56* (2022.01); *G06V 10/62* (2022.01); *G06V 10/82* (2022.01)

(58) Field of Classification Search
CPC ........ G06V 20/46; G06V 10/25; G06V 10/26; G06V 10/56; G06V 10/62; G06V 10/82
See application file for complete search history.

(56) References Cited

U.S. PATENT DOCUMENTS 8,089,515 B2 * 1/2012 Chebil .................. G03B 13/36 348/169
8,238,605 B2 * 8/2012 Chien .................... G06V 20/52 382/173

(Continued)

FOREIGN PATENT DOCUMENTS

WO WO-2017051499 A1 * 3/2017 ............ G06V 20/46

OTHER PUBLICATIONS

Song, Wei, et al. "Motion-based skin region of interest detection with a real-time connected component labeling algorithm." Multimedia tools and applications 76.9 (2017): 11199-11214. (Year: 2017).*

(Continued)

*Primary Examiner* — Utpal D Shah
(74) *Attorney, Agent, or Firm* — STAAS & HALSEY LLP

(57) ABSTRACT

A method of detecting moving elements in a video file, comprising: receiving a video file in which a target colored moving element can be located; extracting video frames into images; pre-process the images. The pre-processing the images comprises detecting a desired motion pattern and generating a desired motion pattern region of interest where said desired motion pattern is detected; detecting a desired color signature and generating a desired color signature region of interest where said desired color signature is detected; and detecting an intersection between the desired motion pattern region of interest and the desired color signature region of interest. The pre-processing the includes images digital zooming on intersection; and inferring, at the intersection, by a convolutional neural network, the target colored moving element in the images and reporting the identification of said target colored moving element.

8 Claims, 3 Drawing Sheets

(51) Int. Cl.

| | |
|---|---|
| ***G06V 10/26*** | (2022.01) |
| ***G06V 10/56*** | (2022.01) |
| ***G06V 10/62*** | (2022.01) |
| ***G06V 10/82*** | (2022.01) |

(56) References Cited

U.S. PATENT DOCUMENTS

| | | | |
|---|---|---|---|
| 9,147,259 | B2 | 9/2015 | Bobbitt et al. |
| 10,380,741 | B2 | 8/2019 | Yedla et al. |
| 11,055,854 | B2 | 7/2021 | Han et al. |
| 11,182,611 | B2 | 11/2021 | Ganti et al. |
| 2018/0315196 | A1* | 11/2018 | Socek .................... G06V 10/56 |
| 2020/0186816 | A1* | 6/2020 | Croxford ............. H04N 19/172 |
| 2022/0147752 | A1* | 5/2022 | Liao ...................... G06T 3/4038 |
| 2022/0215560 | A1* | 7/2022 | Ji .............................. G06T 7/90 |
| 2022/0230333 | A1* | 7/2022 | Kashimoto ............. G06T 7/246 |
| 2025/0292572 | A1* | 9/2025 | Rodrigues De Paula ................... G06V 20/46 |

OTHER PUBLICATIONS

Baykara, Hüseyin Can, et al. “Real-time detection, tracking and classification of multiple moving objects in UAV videos.” 2017 IEEE 29th International Conference on Tools with Artificial Intelligence (ICTAI). IEEE, 2017. (Year: 2017).*

* cited by examiner

METHOD FOR DETECTING COLORED MOVING ELEMENTS IN A VIDEO FILE

CROSS-REFERENCE TO RELATED APPLICATION(S)

This application is based on and claims priority under 35 U.S.C. § 119 to Brazilian Patent Application No. BR 10 2024 005116 5, filed on Mar. 14, 2024, in the Brazilian Intellectual Property Office, the disclosure of which is incorporated by reference herein in its entirety.

TECHNICAL FIELD

The present invention refers to image classification using convolutional neural networks "CNN" in conjunction with pre-processing techniques by means of digital image processing "DIP", ensuring low demand for processing power for application in systems with low processing power (such as embedded systems) while improving the performance of classifying elements in the image.

BACKGROUND OF THE INVENTION

Machine learning "ML" applications involving image classification demand significant computational resources, posing a challenge for many devices. This creates a barrier to the widespread adoption of the technology, particularly on less powerful platforms. Even CNN models designed for embedded systems can strain a single processor, consuming substantial processing power central from processing units "CPU". Additionally, running this process concurrently with others requires multiple processor cores to keep all processes running properly. Considering that random access memory "RAM" is expensive for manufacturers and therefore reduced in small electronics, implementing embedded CNN models became challenging due to their proportionally high resource consumption.

Image classification uses information from a single image to detect whether a target moving element is present or absent. In general, images are a static representation of a three-dimensional scene represented in a two-dimensional projection and do not carry movement information from a clear context. It is difficult, and in many cases impossible, to judge the direction, speed, or frequency of movement based on information from a single image. Most image classification systems run CNN inferences in a loop, continuously monitoring frames and waiting for the target element to appear. During the time interval that inferences are in a loop waiting for the target element to appear, one can observe false positives. Therefore, this loop computes costly CNN model inferences unnecessarily, also negatively impacting the accuracy of detection.

Document U.S. Pat. No. 9,147,259 B2, published on Sep. 29, 2015, in the name of INTERNATIONAL BUSINESS MACHINE CORPORATION and entitled "MULTI-MODE VIDEO EVENT INDEXING" refers to a multi-mode video event indexing that includes determining a distinguishing quality object relative to the images of a video stream input. A high-quality analytical mode is selected from multiple modes and applied to input video images via a hardware device to determine object activity in the input video images if the determined level of detected quality of image distinction object meets a quality threshold level, otherwise a low-quality analytical mode is selected and applied to the input video images via a hardware device to determine object activity in the input video images, where low-quality analytical mode is different from high-quality analytical mode.

Document U.S. Pat. No. 10,380,741 B2, published on Aug. 13, 2019, in the name of SAMSUNG ELECTRONICS CO., LTD and entitled "SYSTEM AND METHOD FOR A DEEP LEARNING MACHINE FOR OBJECT DETECTION" describes apparatus and methods of manufacturing the same, systems and methods for object detection using a region-based deep learning model are described. In one aspect, a method is provided in which a region proposal network "RPN" is used to identify regions of interest "RoI" in an image by assigning confidence levels. The assigned confidence levels of the RoIs are used to increase the background score assigned by the downstream classifier to each RoI, and the background scores are used in a softmax function to calculate the final class probabilities for each object class.

Document U.S. Pat. No. 11,182,611 B2, published on Nov. 23, 2021, in the name of INTERNATIONAL BUSINESS MACHINE CORPORATION and entitled "FIRE DETECTION VIA REMOTE SENSING AND MOBILE SENSORS" describes event detection methods and systems. A satellite image is obtained, and the satellite image is processed using a first CNN to produce a satellite vector that identifies at least one fire. A mobile sensor is automatically directed to a mobile location based on the satellite vector.

Document U.S. Pat. No. 11,055,854 B2, published on Jul. 6, 2021, in the name of SEOUL NATIONAL UNIVERSITY R&DB FOUNDATION and entitled "METHOD AND SYSTEM FOR REAL-TIME TARGET TRACKING BASED ON DEEP LEARNING" refers to a method and system for tracking real-time target based on deep learning. The method for real-time target tracking is performed by a computing device including a processor and includes pre-training a target tracking model to detect a tracking target from an image using pre-entered training data, receiving an image with a plurality of frames and detecting the tracking target for each of the plurality of frames by applying the target tracking model to the image.

A problem with the prior art is the fact that solutions are still unable to successfully optimize processing power of image classification without compromising classification performance when used in embedded systems. Some solutions avoid using CNN models to reduce processing and choose to apply a lot of feature extraction and analysis for this purpose. However, prior art classification achieves top performance with CNN models, in that sense, circumventing their use may not be ideal.

Another problem with the prior art is the fact that there is little commitment to reduce the demand for processing power, thus limiting the application in low-cost devices (such as embedded systems) and leaving problems unsolved in several applications.

SUMMARY

An objective of the present invention is to provide a method for detecting colored moving elements in a video file that solves the problems of the prior art.

This objective is achieved through a method for detecting colored moving elements in a video file comprising the following:

- receiving a video file in which a target colored moving element may be located;
- extracting video frames, from the video file, into images;
- pre-processing the images;

wherein pre-processing the images comprises detecting a desired motion pattern and generating a desired motion pattern region of interest where said desired motion pattern is detected;

wherein pre-processing the images further comprises detecting a desired color signature and generating a desired color signature region of interest where said desired color signature is detected;

wherein pre-processing the images further comprises detecting an intersection between the desired motion pattern region of interest and the desired color signature region of interest;

digital zooming on intersection, by means of screening and considering only a selected number of pixels from the full image scope to generate a new image in a reduced scope; and inferring, at the intersection, by means of a convolutional neural network, the target colored moving element in the images and notify the identification of said target colored moving element.

Conveniently, the method according to the present invention consists of the fact that, if the desired movement pattern is not detected, it returns s to the video frame extraction.

The method according to the present invention also consists of the fact that if there is no detection of the desired color signature, it returns to the video frame extraction.

Furthermore, the method according to the present invention consists in the fact that if there is no detection of the intersection between the desired movement pattern region of interest and the desired color signature region of interest, it returns to the video frame extraction.

In addition, the method according to the present invention consists in the fact that the digital zoom extracts from the video frames, considering the intersection area as central point, a selection of pixels used as input of the CNN model according to model input layer specification.

Additionally, the method according to the present invention consists in the fact that if the inference does not detect the target colored moving element, it returns to the video frame extraction.

Furthermore, the method according to the present invention consists in the fact that the detection of the desired motion pattern and the generation of the desired motion pattern region of interest is done by means of background subtraction "BGS" and the detection of the desired color signature and generating a desired color signature region of interest is done by means of color space signature detection "CSSD".

An advantage of the present invention is the fact that, by pre-processing the images instead of using the inference of the CNN model at once, there is an improvement in the accuracy in recognizing elements in the images, a reduction in computational costs and greater processing speed.

BRIEF DESCRIPTION OF THE DRAWINGS

The objects and advantages of the present invention will become clearer through the following detailed description of the examples and non-limiting drawings presented at the end of this document.

DETAILED DESCRIPTION

Although the present invention may be susceptible to different embodiments, a preferred embodiment is shown in the following detailed discussion with the understanding that the present description should be considered an exemplification of the principles of the invention and that the present invention is not intended to be limited to what has been illustrated and described here.

Figure 1:
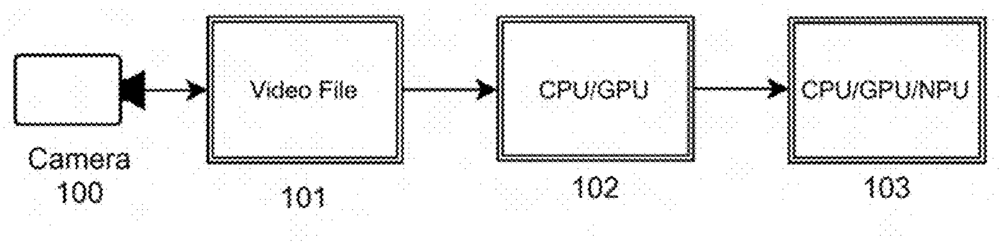
FIG. 1 illustrates the system in which the method according to an embodiment of the present invention operates.

According to FIG. 1, the system comprises a camera 100 that records a video file 101. The camera can be any recording device, such as a smartphone, webcam, or a traditional recording camera. The video file 101 is preprocessed for motion and color detection using resources of a CPU or a graphics processing unit "GPU" 102. The CPU 102 may be a device with an embedded CPU capable of perform minimal mathematical calculations for digital image processing, a notebook or personal computer. After preprocessing, there is a convolutional neural network inference, which can be done using a CPU, GPU, or a neural processing unit "NPU" 103.

Figure 2:
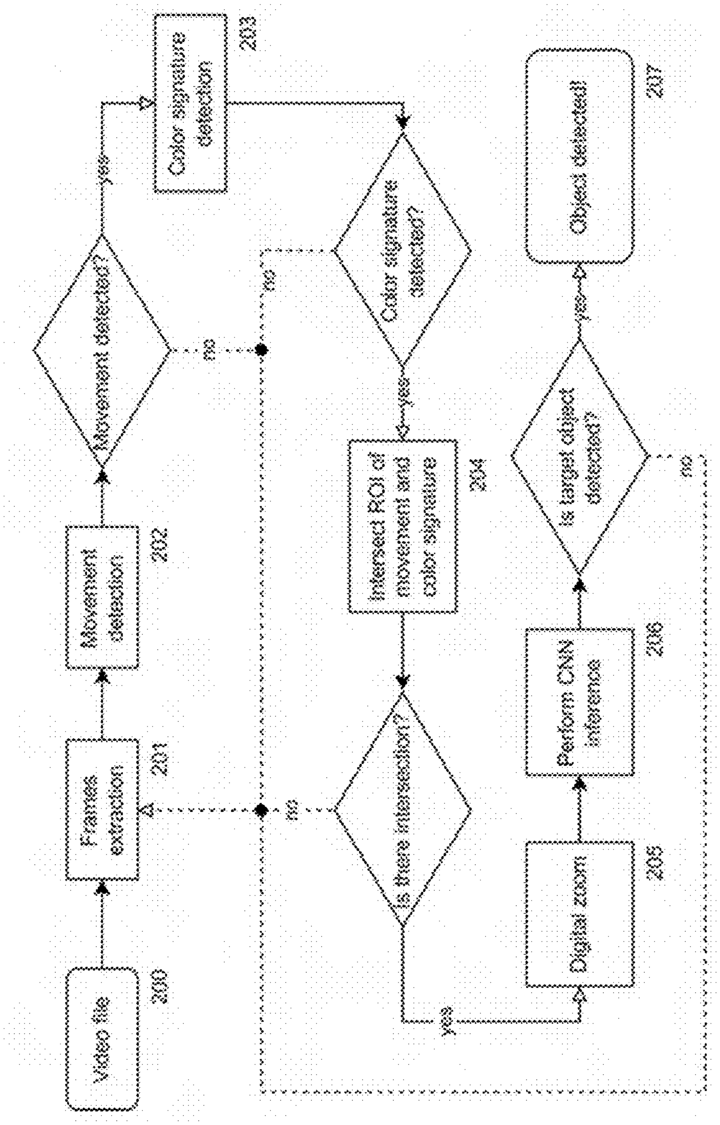
FIG. 2 illustrates the flowchart of the method for detecting a target colored moving element in a video file using machine learning and digital image processing in accordance with an embodiment of the present invention.

According to FIG. 2, the first operation of the method for detecting a target colored moving element in a video file using machine learning and digital image processing comprises receiving 200 the video file, in which a target colored moving element may be located, and extracting 201 the video frames as images.

Then, the images are pre-processed. In pre-processing, an algorithm is used to detect 202 a desired motion pattern and generate a desired motion pattern region of interest where said pattern is detected. The desired motion detection algorithm used can be background subtraction "BGS" or any other algorithm capable of detecting motion and generating a region of interest. Furthermore, if no desired motion pattern is detected, the method returns to the video frame extraction 201.

Still in pre-processing, after detecting 202 the desired motion pattern and generating the desired motion pattern region of interest, the method uses another algorithm to detect 203 a desired color signature and generate a signature region of interest where said color signature is detected. The desired color signature detection algorithm used can be the color space signature detection "CSSD" or any other algorithm capable of detecting a color signature and generating a region of interest. The CSSD searches for groups of pixels that conform to a specific pattern represented in the color space and generates a region of interest containing eligible pixels. Furthermore, if there is no detection of the desired color signature, the method returns to the video frame extraction 201.

Also in pre-processing, there is a detection 204 of intersection between the desired motion pattern region of interest and the desired color signature region of interest. If there is an intersection, then there is the possibility that a target colored moving element moving with the desired motion that has the desired color signature. Furthermore, if there is no intersection, the method returns to the video frame extraction 201.

During pre-processing, the intersection area plays a significant role for the inference operation named "digital zoom" 205. CNN models are static binaries and compute the output performing a series of matrixial operations along their neural network layers. The length and numeric precision of these layers gives the binary size. The model receives an image as input in the input layer and outputs either true or false on the output layer. The input layer length is the number of "neurons" on input layer and defines the expected input image size and shape. Once the model is generated, its input reads images of size according to its input layer specification. CNN models deployed for embedded systems usually have reduced quality input images. The attention point is that recording image quality is most of the times higher than the image quality expected as input by CNN models. The standard practice is resizing and reducing the entire image frame quality extracted by the recording to adequate to CNN model input layer. The present invention uses the intersection area as valuable information of where the detection system may find the target element. The digital zoom preserves the intersection area quality as high as possible when manipulating the image to generate the model input image. The digital zoom focuses on the scope of the intersection and trims off most of the remaining areas that are unnecessary to fit on the model expected image size and shape. Therefore, the digital zoom 205 on the intersection is performed by means of screening and considering only a selected number of pixels from the full image scope to generate a new image in a reduced scope. Additionally, the digital zoom 205 extracts from the video frames, considering the intersection area as central point, a selection of pixels used as input of the CNN model according to model input layer specification.

Finally, after the digital zoom from intersection detection 205, the convolutional neural network performs an inference 206 on the intersection to detect the target colored moving element in the images and reports if the element is either present or absent. If inference 206 does not detect the target colored moving element, the method returns to the video frame extraction 201. On the other hand, if inference 206 detects the target element, the system signalizes a detection 207.

Figure 3:
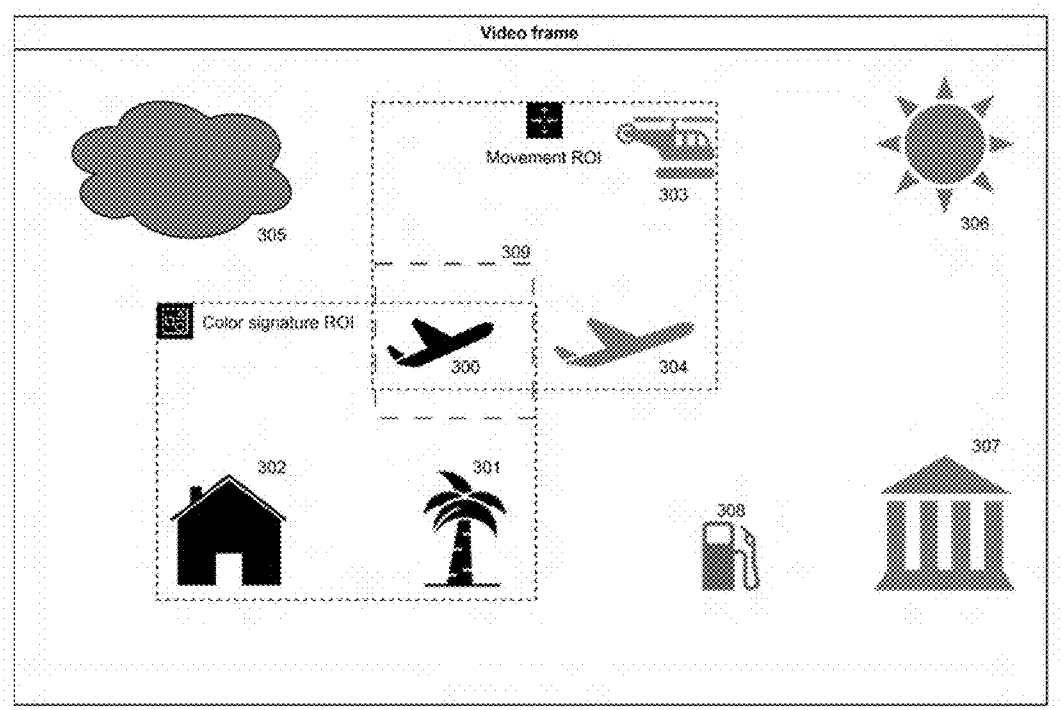
FIG. 3 illustrates an exemplary implementation of the method according to an embodiment of the present invention.

FIG. 3 illustrates an exemplary implementation of the method according to the present invention, in which a sample of a processed video frame is illustrated. According to FIG. 3, the airplane 300, the target colored moving element, is black and is moving in the air. There are other elements on the frame that are similarly colored, such as the tree 301 and the house 302, which are also black. There are also other target colored moving elements in the frame with speed close to that of the black airplane 300, such as the gray helicopter 303 and the gray airplane 304. In the frame, there are other static elements that do not share colors with the target colored moving element (black airplane 300), such as the cloud 305, the sun 306, the museum 307, and the gas pump 308. The motion detection algorithm detects the desired motion pattern and generates the desired motion pattern region of interest, containing all moving elements (the black airplane 300, the helicopter 303, and the gray airplane 304). Then, the color signature detection algorithm detects the desired color signature and generates a desired color signature region of interest, containing all elements with the desired color signature (the black airplane 300, the tree 301, and the house 302). Next, the intersection 309 of the motion and color regions of interest is performed to decide whether the target colored moving element can be in the frame. If the intersection exists 309, then the target colored moving element can be found within it, and inference can be performed to try to detect it at the intersection 309. In the example case of FIG. 3, the moving black airplane 300 will be detected.

Figure 4:
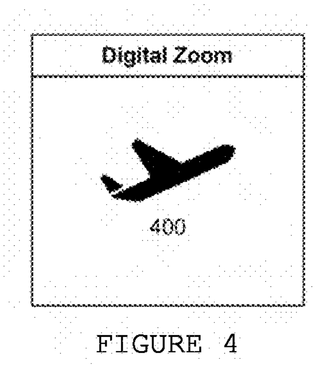
FIG. 4 illustrates the image given as input to CNN model by digital zooming according to an embodiment of the present invention.

FIG. 4 illustrates the image given as input to CNN model by digital zooming. The model perceives the scene in a reduced scope eliminating excessive information and additionally enhancing image quality enabling more reliable inferences.

In addition to the embodiments presented above, the same inventive concept may be applied to other alternatives or possibilities for using the invention.

Although the present invention has been described in relation to certain preferred embodiments, it should be understood that it is not intended to limit the invention to those particular embodiments. Rather, it is intended to cover all possible alternatives, modifications and equivalences within the spirit and scope of the invention, as defined by the appended claims.

What is claimed is:

1. A method of detecting colored moving elements in a video file, comprising:
- receiving a video file in which a target colored moving element is to be located;
- extracting video frames, from the video file, into images;
- pre-processing the images including:
  - detecting a desired motion pattern and generating a desired motion pattern region of interest where the desired motion pattern is detected;
  - detecting a desired color signature and generating a desired color signature region of interest where the desired color signature is detected;
  - detecting whether an intersection area exists between the desired motion pattern region of interest and the desired color signature region of interest;
  - performing a digital zooming on the intersection area based on the intersection area being detected, the digital zooming being performed by screening and considering only a selected number of pixels from a full image scope to generate a new image in a reduced scope while preserving quality of the intersection area; and
  - inferring, using the intersection area as an input of a convolutional neural network (CNN), the target colored moving element in the images and notifying identification of the target colored moving element.

2. The method as in claim 1, wherein based on no detection of the desired motion pattern, returning to the extracting of the video frames from the video file.

3. The method as in claim 1, wherein based on no detection of the desired color signature, returning to the extracting of the video frames from the video file.

4. The method as in claim 1, wherein based on no detection of the intersection area between the desired motion pattern region of interest and the desired color signature region of interest, returning to the extracting of the video frames from the video file.

5. The method as in claim 1, wherein the digital zooming extracts from the video frames, considering the intersection area as a central point, a selection of pixels used as input of a model of the CNN according to model input layer specification.

6. The method as in claim 1, wherein based on the inferring not detecting the target colored moving element, returning to the extracting of the video frames from the video file.

7. The method as in claim 1, wherein the detection of the desired motion pattern and the generation of the desired motion pattern region of interest is done by means of background subtraction “BGS”.

8. The method as in claim 1, wherein detecting the desired color signature and generating the desired color signature region of interest is done based on color space signature detection “CSSD”.

* * * * *